UNITED STATES PATENT OFFICE.

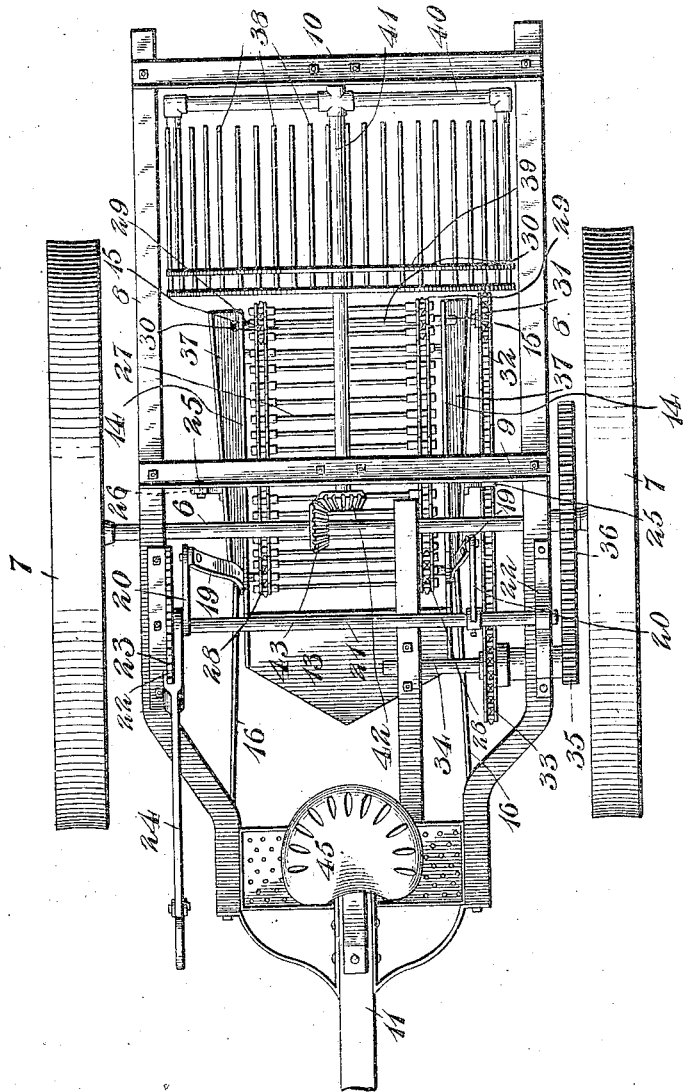

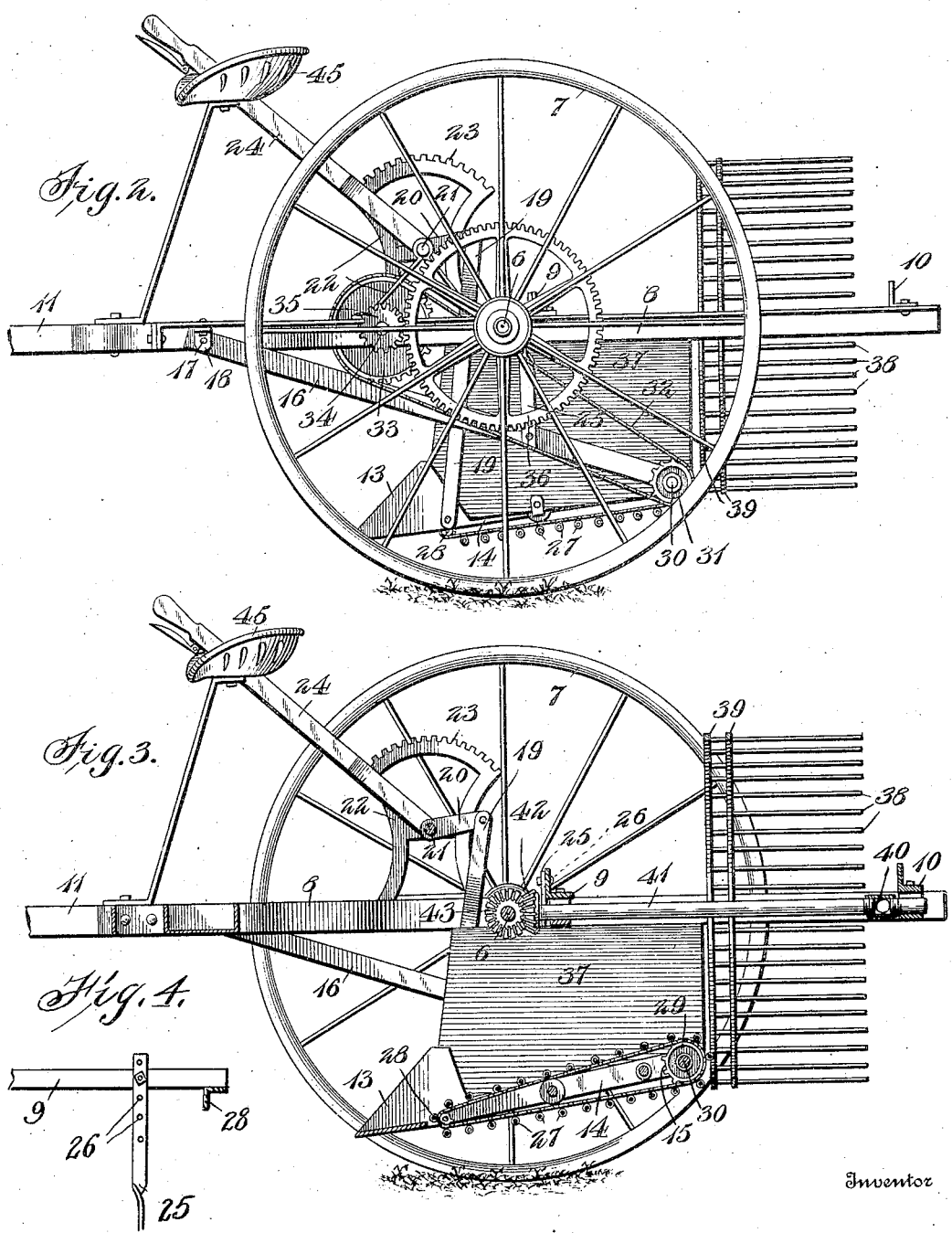

NATHAN KELLER, OF HASTINGS, FLORIDA.

POTATO-DIGGER.

No. 845,239.  Specification of Letters Patent.  Patented Feb. 26, 1907.

Application filed August 20, 1906. Serial No. 331,358.

*To all whom it may concern:*

Be it known that I, NATHAN KELLER, a citizen of the United States, residing at Hastings, in the county of St. John and State of Florida, have invented new and useful Improvements in Potato-Diggers, of which the following is a specification.

This invention is a potato-digger of that class having a shovel, an endless-belt carrier, and a cylindrical rotary screen, in which the shovel lifts the potatoes from the ground and the carrier conveys the material to the screen, the dirt being dislodged from the potatoes during its travel over the carrier and in the screen.

The object of the invention is to produce an improved combination of the parts named with respect to their manner of operation and supporting-frame, the latter being so constructed that the whole machine is fairly balanced upon the axle.

The invention is illustrated in the accompanying drawings.

Figure 1 is a top plan view of the machine. Fig. 2 is a side elevation. Fig. 3 is a central vertical longitudinal section. Fig. 4 is a detail, in elevation, showing an adjustable hanger.

The machine is mounted upon the axle 6 between two main wheels 7, the supporting-frame consisting of side bars 8, connected by cross-bars 9 and 10. The side bars 8 are preferably bent or brought toward each other at the front ends, where they are connected to the tongue 11 by a suitable casting. The main axle 6 finds its bearings in the side bars, between the ends thereof. The frame may conveniently and cheaply be made of angle-iron.

The shovel 13 is carried somewhat in advance of the line of the axle, being attached at each side to the front ends of thrust-bars 14, which are pivotally connected at their rear ends, as at 15, to the rear ends of strain-bars 16, which are pivotally connected at 17 to depending lugs 18 on the under side of the side bars 8, at or about the front ends thereof. The pull is thus transmitted from the tongue and frame through the bars 16 and 14 to the shovel.

The shovel is raised or lowered and supported in adjusted position by means of links 19, connected to arms 20, projecting from a rock-shaft 21, which is carried in brackets 22 on the side bars of the frame, one of said brackets being extended and formed into a notched segment 23, which receives the latch of a latch-lever 24, projecting from the rock-shaft. By manipulation of the lever the shovel is raised or lowered in an obvious manner.

The bars 16 are supported near their rear ends by hangers 25, bolted to the cross-bar 9, a series of bolt-holes being provided, as indicated at 26, so that the hangers may be made longer or shorter, and the bars 16 accordingly raised or lowered. It will be seen that by this construction the angle of the strain-bars 16 with respect to the frame may be altered, and also the angle of the thrust-bars 14 with respect to the strain-bars 16, which allows the conveyer and shovel to be set at a suitable inclination according to the nature of the ground and the crop or other local conditions.

The conveyer 27 consists of an endless belt of spaced rods, traveling around sprockets or rollers 28 just behind the shovel and sprockets 29 at the rear ends of the bars 14. These latter sprockets are carried by a shaft 30, which finds bearings in the rear ends of said bars 14 and which has upon one end thereof a sprocket 31, driven by a chain belt 32 from a sprocket 33, which is mounted upon a short shaft 34, which has a pinion 35, meshing with a gear 36 on the main axle 6. The potatoes and other material are confined on the conveyer by shields 37 of sheet-iron or the like, attached to the hangers 25 and the bars 16.

The rotary screen consists of a series of rods 38, arranged to form a cylinder and set in rings 39. These rings and the screen are carried by angular arms 40, projecting from the rear end of a shaft 41, which extends lengthwise of the machine and is carried in bearings on the cross-pieces 9 and 10, and this shaft has at its front end a bevel-gear 42, meshing with a bevel-gear 43 on the main shaft 6, whereby said screen is driven. The shaft 41 and arms 40 may conveniently be formed of pipe joined by T and elbow connections, and the arms are located at the rear of or behind the screen, so as not to interfere with the delivery thereto of the material from the conveyer. The parts are so arranged that the material delivered from the conveyer drops into the screen, which by its rotation clears the dirt from the potatoes and allows the latter to fall in a row onto the ground behind the machine.

As will be seen, the shovel and conveyer are located under the axle and main frame by bars and hangers depending therefrom. The balance is such that the whole machine can be supported on two wheels, and therefore readily turned at the row ends and without great weight on the team. The draft on the shovel is transmitted mainly through the strain and thrust bars. A seat 45 is conveniently mounted upon the frame at the rear end of the tongue in convenient position to manage the team and operate the lever 24.

I claim—

1. In a potato-digger, in combination, a wheeled axle, an upper frame mounted at about its middle thereon, strain-bars on each side, pivotally connected at their front ends to the frame in front of the axle and supported at their rear ends by hangers connected to the frame behind the axle, the hangers being vertically adjustable to vary the angle between the frame and the strain-bars, thrust-bars pivoted to the rear ends of the strain-bars and extending forwardly, a shovel and conveyer carried by the thrust-bars, and a supporting and adjusting connection between the frame and the front end of the thrust-bars.

2. In a potato-digger, in combination, a wheeled axle, an upper frame mounted between its ends thereon, strain-bars on each side, pivotally connected at their front ends to the frame in front of the axle and extending rearwardly under the axle, vertically-adjustable hangers connected between the frame and the said bars behind the axle, thrust-bars pivoted to the rear ends of the strain-bars and extending forwardly therefrom under the axle, a lifting-lever on the frame in front of the axle and having a supporting connection to the front ends of the thrust-bars, and a shovel and conveyer carried by the thrust-bars.

In testimony whereof I have signed my name to this specification in the presence of two subscribing witnesses.

NATHAN KELLER.

Witnesses:
 GEO. P. FOWLER,
 ANNA C. FOWLER.